United States Patent [19] [11] 4,115,490
Munk [45] Sep. 19, 1978

[54] MOLDING METHOD

[75] Inventor: Edmund Munk, Oberstenfeld, Germany

[73] Assignee: Furnier- und Sperrholzwerk J. F. Werz Jr. KG Werzalit-Pressholzwerk Oberstenfeld, Oberstenfeld, Germany

[21] Appl. No.: 640,384

[22] Filed: Dec. 12, 1975

Related U.S. Application Data

[63] Continuation of Ser. No. 479,490, Jun. 14, 1974, abandoned, which is a continuation-in-part of Ser. No. 224,511, Feb. 8, 1972, abandoned.

[30] Foreign Application Priority Data

Feb. 9, 1971 [DE] Fed. Rep. of Germany ....... 2105998

[51] Int. Cl.[2] ........................ B29C 25/00; B29G 1/00

[52] U.S. Cl. ....................................... 264/26; 264/120; 264/121; 264/126; 264/236; 264/336

[58] Field of Search .................. 264/26, 25, 109, 126, 264/121, 122, 336, 236, 347, 120; 219/10.65

[56] References Cited

U.S. PATENT DOCUMENTS

| | | | |
|---|---|---|---|
| 1,972,050 | 8/1934 | Davis | 219/10.65 |
| 2,038,251 | 4/1936 | Vogt | 264/26 |
| 2,697,254 | 12/1954 | Gordon | 264/26 |
| 3,021,244 | 2/1962 | Meiler | 264/120 |
| 3,207,819 | 9/1965 | Raddin et al. | 264/26 |
| 3,389,427 | 6/1968 | Reyburn | 264/25 |
| 3,687,877 | 8/1972 | Runton | 264/120 |
| 3,759,775 | 9/1973 | Shepherd | 264/26 |
| 3,846,522 | 11/1974 | Goldman | 264/25 |

OTHER PUBLICATIONS

Wakeman, Chemistry of Commercial Plastics, Reinhold (1947), N.Y., pp. 174 & 824.

*Primary Examiner*—W.E. Hoag
*Attorney, Agent, or Firm*—Michael J. Striker

[57] ABSTRACT

A mixture of a fibrous material and a hot-setting binder is formed and subjected to the action of a high-frequency electromagnetic field. The mixture is subsequently cold molded and may then be hot molded. The alternating field slightly heats the binder thereby lowering its viscosity and, in addition, causes the moisture and the binder which are entrapped in the fibers of the fibrous material to be displaced towards the surfaces of the fibers. These effects lead to an improvement in the cold-adhesiveness of the mixture.

2 Claims, 3 Drawing Figures

MOLDING METHOD

CROSS-REFERENCE TO RELATED APPLICATIONS

The present application is a continuation of my prior application Ser. No. 479,490, filed on June 14, 1974 now abandoned. Application Ser. No. 479,490 in turn was a continuation-in-part of my prior application Ser. No. 224,511, filed Feb. 8, 1972 now abandoned.

BACKGROUND OF THE INVENTION

The invention relates generally to the molding of moldable substances and, more particularly, to the molding of mixtures which contain a fibrous material and a binder for the latter.

In the manufacture of chip boards, which contain a heat-setting binder, it is known to additionally heat the "fleece", that is, the mixture of fibrous material and binder, either immediately prior to or during the hot-molding operation by means of a high-frequency electrical field. This heating, which is in addition to the conventional contact heating, is intended to accelerate the condensation process. For the purpose of the additional heating, it is possible, for example, to employ the sheets upon which the mixture is distributed and upon which it is inserted into the molding press as electrodes. In this manner, the mixture may be subjected to the influence of a high-frequency field until it has set. Generally, heating is also carried out by conventional contact heating simultaneously. One disadvantage of this method resides in the fact that it is extremely complicated since the sheets upon which the mixture is distributed must be insulated from the metallic parts of the molding press. In addition, it is difficult to achieve satisfactory insulation and the procedures for overcoming the insulation difficulties make this method very expensive. Moreover, by proceeding in the manner described above, the mixture is subjected to a high-frequency field only during the hot-molding operation and this method thus accelerates only the hot-molding operation. Finally, the only advantage achieved by this method, which is an acceleration of the hot-molding operation, in no manner compensates for its high cost.

It has also been proposed to place the fleece on a sheet, for example, and then, outside of the mold and before inserting the fleece therein, to subject the latter to the influence of a high-frequency field in order to preheat it to such an extent that the condensation process is initiated. The preheated fleece is then placed in the mold and immediately compressed, with the final setting of the mixture being effected by contact heating. This method is intended to better utilize the mold by permitting the preheating for the next batch of the mixture to be molded to be carried out while setting of the mixture already in the mold occurs. In this manner, the time for which the mold is occupied by any given batch of the mixture is reduced. However, great insulation difficulties arise with this method also and the necessity for obtaining satisfactory insulation, which latter may be achieved only with great difficulty, make the apparatus for carrying out this method extraordinarily complicated.

In general, the known methods and apparatus described above, have only two purposes. On the one hand, they are intended to accelerate setting of the binder by additionally heating the mixture of fibrous material and binder either during or immediately prior to the hot-molding operation. On the other hand, they are intended to effect better utilization of the molds or molding tools. However, these methods and apparatus are neither intended to nor are capable of improving the quality of the final product. Moreover, these methods and apparatus are not intended for utilization in the production of preformed articles by cold-molding procedures.

SUMMARY OF THE INVENTION

It is, accordingly, a general object of the invention to provide a novel molding method.

Another object of the invention is to provide a molding method which permits improvements in the quality of the final product to be realized.

A further object of the invention is to provide a molding method which permits the cold-tackiness or cold-adhesiveness of a mixture containing a fibrous material and a binder to be increased thereby permitting improvements in the production of preformed articles to be realized.

It is also an object of the invention to provide a molding method which permits the advantages obtainable with high-frequency electromagnetic fields to be realized to their fullest potential in a simple and economical manner.

An additional object of the invention is to provide a molding method which may be used for the production of cold-molded and/or hot-molded articles.

In pursuance of the preceding objects, and of others which will become apparent, the invention provides, in a method of making molded articles, for forming a mixture which includes a fibrous material and a binder. The mixture is subjected to the action of an electromagnetic field and is thereafter cold-molded. If desired, the mixture may also be hot-molded subsequent to the cold-molding operation.

As may be seen, one important concern of the invention is with the production of molded articles from a mixture which includes fibers and a binder. Advantageously, the binder is of the type which sets under the influence of heat. Under such circumstances, a preformed article may be produced first by cold-molding and the thus-formed article made to set subsequently in a hot-molding operation. In this connection, it is intended that manipulation of the preformed article be simplified by increasing the cold-adhesiveness of the binder. This is achieved, in accordance with the invention, by subjecting the mixture of fibers and binder to the action of an electromagnetic field prior to its processing, that is, prior to the cold-molding operation. In this manner, the mixture is slightly heated thereby lowering the viscosity of the binder and, simultaneously, causing the moisture entrapped in the fibers, as well as binder which has impregnated the fibers, to be displaced outwardly towards the surfaces of the fibers. This increases the cold-adhesiveness of the mixture. Advantageously, the electromagnetic field is a high-frequency field.

One application of the invention is to the improvement of the cold-adhesiveness of mixtures which contain a heat-setting binder and comminuted, lignocellulose-containing fiber substances. Examples of the latter are wood chips, dried bagasse fibers and the like.

The invention also encompasses an installation for improving the cold-adhesiveness of mixtures which include a fibrous material and a binder and which are to be used for the production of molded articles. In the installation according to the invention, the mixture is subjected to the action of an electromagnetic high-frequency field.

The installation in accordance with the invention includes means for cold-molding a moldable mixture which includes a fibrous material and a binder. Feeding means is provided for feeding the moldable mixture along a predetermined path. The installation further comprises electrode means defining a passage which forms a portion of the predetermined path and the electrode means is so located that the mixture is fed through the passage defined thereby prior to being cold molded. Means is also provided for connecting the electrode means to a source of high-frequency current so as to permit heating of the mixture in the passage defined by the electrode means and thereby permit an improvement in the cold-adhesiveness of the mixture to be realized. The installation according to the invention may also include means for hot-molding the mixture subsequent to the cold-molding operation.

One important feature of the installation in accordance with the invention resides in the fact that, in an arrangement of any desired type, a pair of electrodes is arranged within the path of travel of the mixture and the mixture is conveyed between the electrodes. The installation of the invention differs from the known apparatus which utilize high-frequency electromagnetic fields in several important respects. On the one hand, the known apparatus can be used only for hot-molding operations. In contrast, the installation according to the invention may be utilized for cold-molding and/or hot molding operations. On the other hand, the known apparatus are of complicated and expensive construction, one reason being that the sheets on which the mixture is conveyed are simultaneously used as electrodes thereby leading to complicated and expensive insulation requirements. In contrast, the installation in accordance with the invention does not require that the sheets or other means on which the mixture is conveyed serve as electrodes but provides for electrodes which may be discrete from the means on which the mixture is conveyed. It will be appreciated that the known apparatus are unsuitable for increasing the cold-adhesiveness of mixtures which contain a fibrous material and binder and for providing improvements in the production of preformed articles. It will be further appreciated that the invention has provided both a method and an installation which are more flexible, less complicated and less expensive than those known from the art.

According to one embodiment of the invention, the mixture is conveyed to a discharge point by means of a conveyor belt which conveys the mixture between the pair of electrodes. According to another embodiment of the invention, the electrodes are located downstream of a weighing device or a discharge roller and define a vertically oriented passage so that the individual particles of the mixture fall freely between the electrodes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
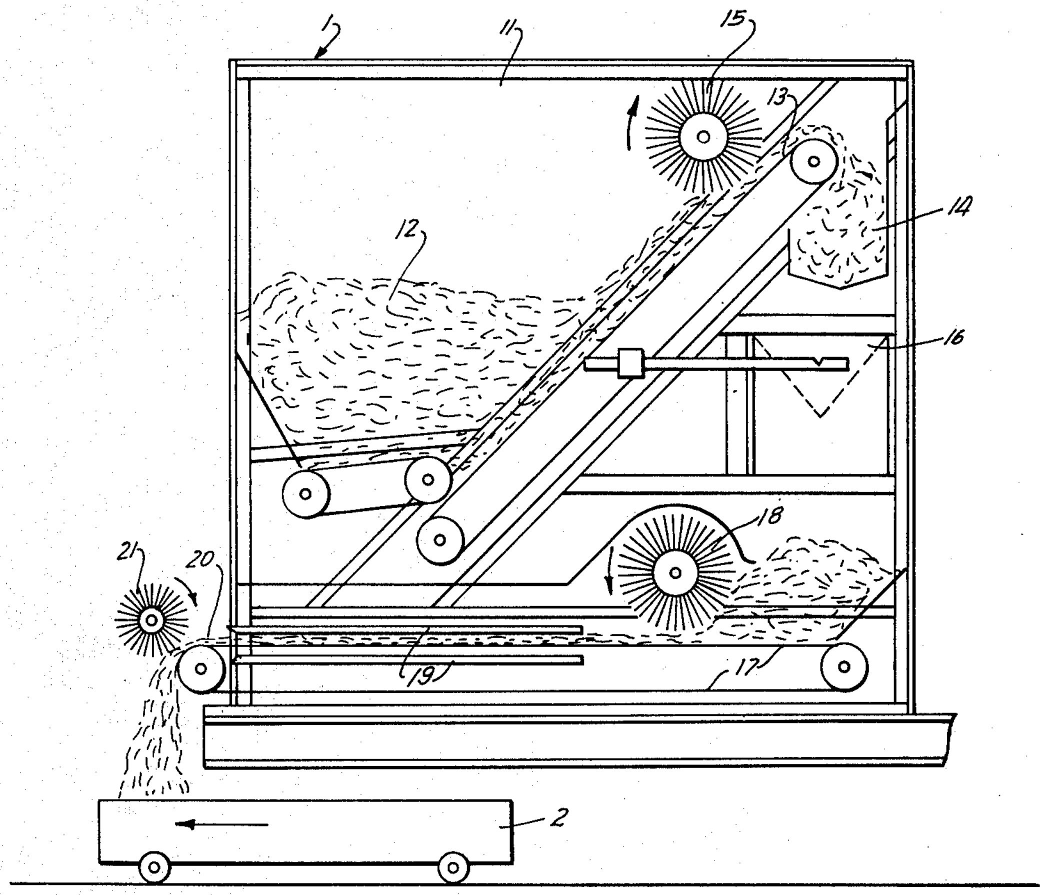
FIG. 1 is a diagrammatic representation of one form of an installation for carrying out the method according to the invention.

FIG. 1 illustrates a strewing machine 1 which is of a type generally known an such as is adapted to charge a mold 2. The mold 2 may, for example, be in the form of a bottom or female die and travels beneath the point of discharge of material from the machine 1. Instead of the mold 2, it is also possible to employ a sheet upon which a fleece is applied for the production of a chip board. The strewing machine 1 includes a chip container 11 which accommodates a mixture 12 to be compressed. The mixture 12 is withdrawn from the container 11 by a conveyor belt 13 which conveys it to a feed hopper 14. A leveling roller 15 is provided upstream of the upper discharge point of the mixture from the conveyor 13 and serves to uniformly distribute the mixture.

The mixture 12 generally comprises a moldable material which includes a mixture of fibrous substances and a hot-setting binder. The moldable material may, in certain instances, be characterized as being porous in that the hot-setting binder is absorbed by or penetrates the interior of the fibrous substances.

From the feed hopper 14, the mixture passes to a weigh feeder 16 from which it is dropped, for example, in an automatic proportioning operation, upon a receiving table which is here illustrated as being in the form of an endless conveyor belt 17. The belt 17 passes beneath a leveling roller 18 which determines the layer thickness of the mixture.

A pair of electrodes 19 is mounted downstream of the roller 18 and, by means of a high-frequency circuit which has not been shown for the sake of clarity, a high-frequency electromagnetic field is produced between the electrodes 19 in known manner. Upon passage of the mixture through this electromagnetic field, the effects as described above are produced. Thus, on the one hand, the mixture is preheated and, on the other hand, the moisture and synthetic resin, that is, hot-setting binder, which have penetrated the individual particles or chips are at least partially brought to the outer surfaces thereof. As a result, the cold-adhesiveness or cold-tackiness of the mixture is increased and the properties of a premolded article subsequently produced by cold-molding are significantly improved.

The electrodes 19 extend up to a point which is spaced a short distance upstream of the discharge point 20 of the mixture from the belt 17. A discharge brush roller 21 is provided in the region of the discharge point 20 and, upon reaching the latter, the mixture is filled into the mold 2 which passes beneath the discharge point 20. The mixture is then immediately compressed in a cold press into the form of a premolded article or blank which is thereafter given its final shape in a hot-molding operation during which the binder also sets.

According to a particularly advantageous embodiment of the invention, the premolded blank is inserted into a hot mold immediately after production thereof. In this case, the blank still retains a considerable amount of the heat which was generated in the high-frequency electromagnetic field so that, aside from the improved quality of the premolded blank, an acceleration of the setting process is also achieved. In addition to this, however, the final molded article obtained from the hot-molding operation also possesses better strength properties than could be achieved heretofore which, likewise, may be attributed to the improved adhesive properties of the chips or fibers which have been influenced by the alternating field.

Preferably, the conveyor belt 17 is made of a material having a low dielectric constant such as, for example, synthetic rubber.

Figure 2:
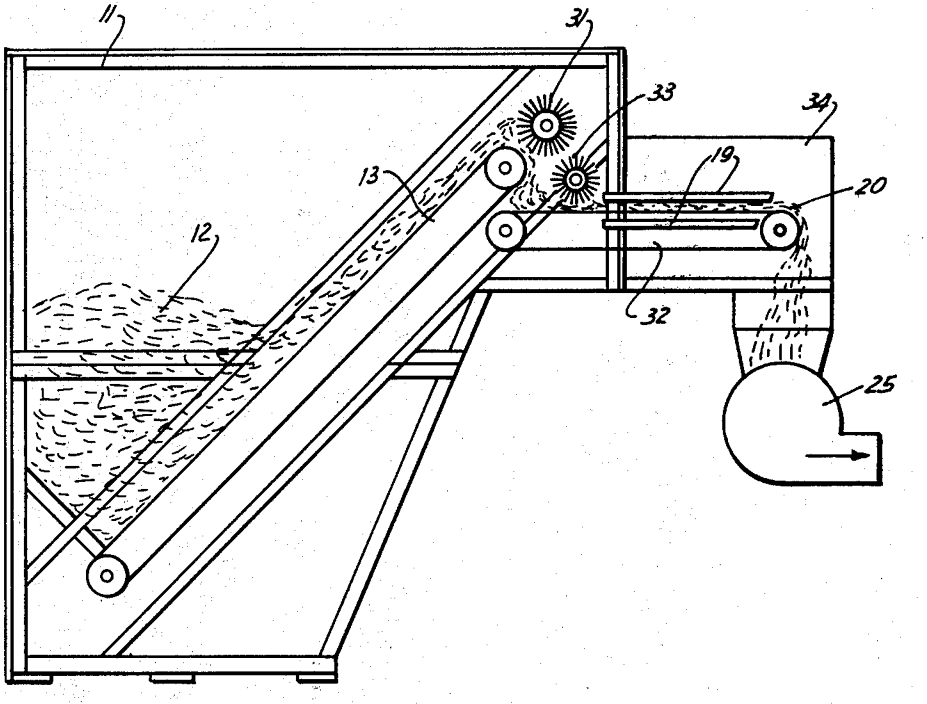
FIG. 2 is a diagrammatic representation of another form of an installation for carrying out the method according to the invention.

Instead of the strewing machine 1, it is, of course, also possible to provide an arrangement in which the mixture to be compressed is blown into the mold to be charged. Such a method is especially preferred when molds of particularly intricate shapes are to be filled. An arrangement suitable for carrying out such a method is illustrated in FIG. 2, where the same reference numerals as in FIG. 1 have been used to designate similar components. Here, also, a moldable mixture 12 is accommodated in a chip container 11 from which it is withdrawn by means of an endless conveyor belt 13. Near the end of the belt 13, that is, in the region of the point where the mixture is discharged from the latter, there is provided a discharge brush roller 31. Upon being discharged from the belt 13, the mixture is thrown or deposited upon a horizontally extending second conveyor belt 32. A leveling roller 33 uniformly distributes the mixture on the belt 32. Downstream of the roller 33, there is again provided a pair of electrodes 19 between which a high-frequency electromagnetic field is produced. The mixture accommodated upon the conveyor belt 32 is passed through the electromagnetic field. After passing through the electromagnetic field, the mixture is conveyed to the end of the conveyor belt 32, that is, to the discharge point 20 thereof. Upon reaching the end of the conveyor belt 32, the mixture is thrown off and is caught up by an air current which is generated by means of a fan 25 or the like. The air current conveys the mixture through a channel and into the mold to be charged.

The conveyor belt 32 is also preferably made of a material having a low dielectric constant. For the purpose of screening off the high-frequency electromagnetic field, that part of the arrangement which accommodates the electrodes 19 is surrounded by a box-shaped metal screen or shelter 34.

Figure 3:
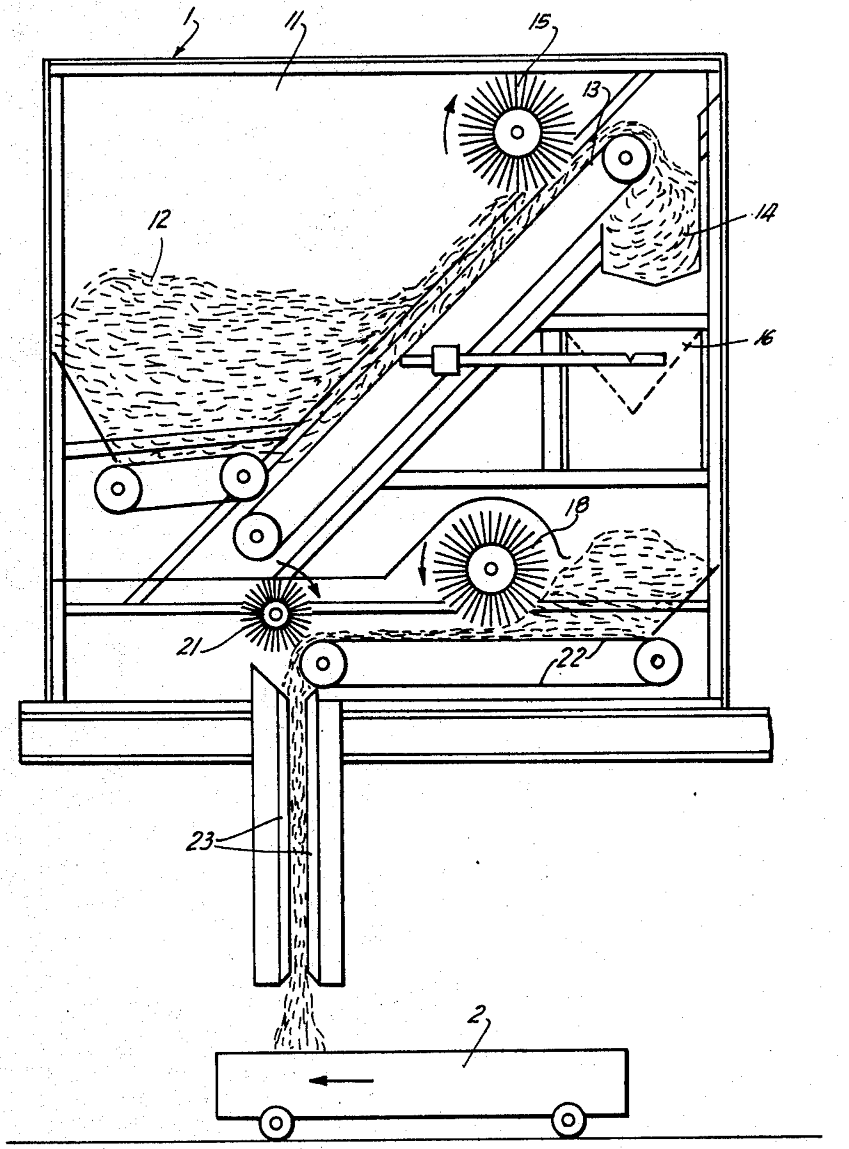
FIG. 3 is a diagrammatic representation of yet another form of an installation for carrying out the method according to the invention.

Instead of positively conveying the chip mixture through the electromagnetic field on a conveyor belt, it is also possible to permit the particles forming the mixture to fall freely between two vertically oriented electrodes. This is illustrated in FIG. 3 where, again, the same reference numerals as in the preceding FIGURES have been used to designate similar components. In fact, the arrangement of FIG. 3 corresponds substantially to that of FIG. 1 and differs from the latter primarily in that the conveyor belt 22 which serves as a discharge or receiving table is shorter than the conveyor belt 17 in FIG. 1 and does not pass between a pair of electrodes. Here, it is only downstream of the discharge point of the conveyor belt 22, in the region of which point there is located the discharge brush roller 21, that a pair of electrodes is provided. The electrodes are designated by the reference numeral 23 and it may be seen that they are vertically arranged. The mixture thrown off or discharged from the conveyor belt 22 falls freely downwardly between the electrodes 23 under the influence of gravity. The mixture passing between the electrodes 23 may either fall directly into the horizontally displaceable mold 2 or may be conveyed thereto via a further, non-illustrated, intermediate conveyor belt. It is, of course, self-understood that the vertically arranged electrodes 23 may be provided at a suitable location of the arrangement other than that illustrated. For instance, the electrodes 23 may be arranged between the weighing device 16 and the conveyor belt 17.

The individual chips or fibers possess a certain amount of porosity and, because of this porosity, they contain a certain quantity of moisture and, in addition, take up or absorb a portion of the resin used as a binding agent, which resin is mostly utilized in a dissolved form. Due to the influence of the high-frequency electromagnetic field, heating occurs interiorly of the individual chips or fibers. This heating may be attributed to the internal friction of the molecules which oscillate under the influence of the electromagnetic field. As a result of this heating, a form of precondensation sets in which initially effects a lowering of the viscosity of the resin. Simultaneously, the resin, as well as the moisture, are displayed outwardly so that, in actuality, a substantially improved cold-adhesiveness is achieved by virtue of the enrichment of the outer surfaces of the individual particles with moisture and with resin of reduced viscosity. This improved cold-adhesiveness favorably influences the shaping of the premolded blank or article. Also, since the heat generated by the electromagnetic field may, when using a suitable operating cycle, still be retained in the premolded blank to a great extent when the blank is finally compressed and the binding agent is permitted to set in a second operating stage, it is possible to simultaneously achieve, as a side effect, an improvement in the hot-molding operation also. In addition, it has been found that molded articles made in this manner exhibit increased strength when subjected to transverse stresses and to bending.

It has been further found that arrangements in accordance with the invention provide significant advantages even when the moldable mass discharged from the charging apparatus is immediately hot-molded. In this case also the finished molded articles exhibit qualitatively better properties than those of the prior art, particularly as regards the strength of the molded articles when subjected to transverse stresses and to bending. The reason for the improved properties likewise resides in the above-described described processes such as the displacement of resin and moisture to the outer surfaces of the individual particles. The improved properties of the molded articles are in addition to the fact that, by providing for the influence of a high-frequency electromagnetic field to be applied to the material in the charging apparatus rather than in the mold as is the case with the prior art, the invention achieves the advantage that the construction of the total arrangement may be substantially simpler and of substantially lower cost than corresponding prior art arrangements.

According to the invention, the mixture utilized as the moldable mass may, on the one hand, include comminuted fibrous materials and, on the other hand, a binder or binding agent. Examples of fiber materials which may be used in accordance with the invention are wood chips or shavings, sawdust, suitably pretreated bagasse and comminuted banana stems or stalks.

In addition, the known plant fibers such as, for instance, sisal, hemp, flax and the like may be used. It will be appreciated that the term fibrous materials as used herein encompasses particulate materials and it will be understood that the term fibrous materials is intended to comprise particulate materials.

Heat-setting binders which may be used in accordance with the invention include aminoplasts and phenoplasts, for example, urea resins and melamine resins. Other examples of heat-setting binders which may be utilized are the cresylic resins (methyl phenols) and the phenolic resins (phenolformaldehyde resins).

It will be appreciated that the fibrous materials and heat-setting binders listed above are merely illustrative of the substances which may be used and are not intended to exclude other suitable substances. The particular fibrous materials and particular heat-setting binders used will be determined by the specific application.

The proportion of binder in the mixture will depend upon the desired results. Generally, the binder constitutes between about 5 and 40 percent by weight of the total mixture. The binder may be incorporated in the mixture in several ways. For instance, the binder may be sprayed onto the fibrous material in the form of an aqueous solution or it may be used in granular form and admixed with the fibrous material.

Depending upon the binder used and upon the characteristics of the mixture such as the composition thereof, the mixture is heated to a temperature of approximately 40° to 100° C. during its passage through the high-frequency electromagnetic field. Thereafter, it may be compressed to the form of a premolded article or blank in a non-heated press or mold. Where a second molding operation is desired, the premolded blank is heated to a temperature of about 140° to 200° C. in a heated press or mold and is permitted to set or harden.

By proceeding in accordance with the invention, a wide variety of articles may be produced. Some examples illustrative of the applicability of the invention are shaped articles such as, for instance, pallets, seats for chairs and the like, structural profiles for window seats or benches, beam railings and wall linings. Other examples are chip boards and hollow bodies as well as a great variety of other articles.

As will be self-understood, all of the above-outlined possibilities and arrangements for carrying out the method according to the invention are merely exemplary and do not exclude other solutions by which the inventive concept may be realized. For instance, it is self-evidently possible to incorporate the electrode arrangement in accordance with the invention in any arbitrary charging apparatus regardless of which known system is being utilized.

The frequency used for the generation of the electric alternating field can range from 8–30 megacycles.

The material to be pressed is exposed to this alternating field only during the period of input of such material which takes appr. 1 to 10 seconds.

It will be understood that each of the elements described above, or two or more together, may also find a useful application in other types of methods and arrangements differing from the types described above.

While the invention has been illustrated and described as embodied in a molding method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. In a method of making molded articles, in combination, the steps of storing in a supply container a pourable mixture comprised of a heat-setting binder and a particulate and porous fibrous material the fibers of which contain in absorbed condition both moisture and a part of the heat-setting binder; continually transporting the pourable mixture of heat-setting binder and fibrous material from the supply container along a predetermined path into an unheated mold, the transporting step comprising pouring the pourable mixture into the unheated mold; subjecting the mixture poured into the unheated mold to a cold-molding operation in the mold without addition of heat to the mixture in the mold and not resulting in setting of the binder; during said transporting step utilizing a high-frequency electromagnetic field to impart to the pourable mixture of heat-setting binder and fibrous material, prior to entry thereof into the unheated mold, an adhesiveness so great that the mixture in the unheated mold, upon completion of a molding operation without addition of heat to the mixture in the mold, can be removed from the unheated mold as a unitary body and thereafter transported away from the unheated mold without falling apart, the imparting of said adhesiveness consisting of utilizing the high-frequency electromagnetic field to heat the pourable mixture of heat-setting binder and fibrous material to a temperature which does not cause the heat-setting binder to set and which is furthermore no higher than between 40° and 100° C. to convert the individual fibers of the fibrous material into a state in which the absorbed moisture and binder within the individual fibers throughout the fibrous material are expelled from the interiors to the surfaces of the individual fibers without thereby substantially changing the overall moisture content of the mixture, said molding operation performed in the unheated mold being carried out with the individual fibers of the fibrous material in said state; and upon completion of the molding operation, and without adding heat to the mixture in the mold, removing the mixture from the unheated mold as a unitary body and transporting it as a unitary body away from the unheated mold.

2. In a method of making molded articles, in combination, the steps of storing in a supply container a pourable mixture comprised of a heat-setting binder and a particulate and porous fibrous material the fibers of which contain in absorbed condition both moisture and a part of the heat-setting binder; continually transporting the pourable mixture of heat-setting binder and fibrous material from the supply container along a predetermined path into an unheated mold, the transporting step comprising pouring the pourable mixture into the unheated mold; subjecting the mixture poured into the unheated mold to a cold-molding operation in the mold without addition of heat to the mixture in the mold and not resulting in setting of the binder; during said transporting step utilizing a high-frequency electromagnetic field to impart to the pourable mixture of heat-setting binder and fibrous material, prior to entry thereof into the unheated mold, an adhesiveness so great that the mixture in the unheated mold, upon completion of a molding operation without addition of heat to the mixture in the mold, can be removed from the unheated mold as a unitary body and thereafter transported away from the unheated mold without falling apart, the imparting of said adhesiveness consisting of utilizing the high-frequency electromagnetic field to heat the pourable mixture of heat-setting binder and fibrous material to a temperature which does not cause the heat-setting binder to set and which is furthermore no higher than between 40 and 100° C. to convert the individual fibers of the fibrous material into a state in which the absorbed moisture and binder within the individual fibers throughout the fibrous material are expelled from the interiors to the surfaces of the individual fibers without thereby substantially changing the overall moisture content of the mixture, said molding operation performed in the unheated mold being carried out with the individual fibers of the fibrous material in said state; and upon completion of the molding operation, and without adding heat to the mixture in the mold, removing the mixture from the unheated mold as a unitary body and transporting it as a unitary body to a heated further mold; and subjecting the body thusly inserted into the heated further mold to a hot-molding operation resulting in setting of the binder.

* * * * *